(12) United States Patent
O'Connor et al.

(10) Patent No.: US 10,650,537 B2
(45) Date of Patent: May 12, 2020

(54) UPDATING REFERENCE IMAGING DATA WITH UPDATE 2D AND/OR 3D IMAGING DATA

(71) Applicant: BK Medical Holding Company, Inc., Peabody, MA (US)

(72) Inventors: John P O'Connor, Andover, MA (US); Nicholas A Accomando, Hingham, MA (US)

(73) Assignee: B-K Medical ApS, Herlev (DK)

( * ) Notice: Subject to any disclaimer, the term of this patent is extended or adjusted under 35 U.S.C. 154(b) by 234 days.

(21) Appl. No.: 15/505,347

(22) PCT Filed: Aug. 22, 2014

(86) PCT No.: PCT/US2014/052260
§ 371 (c)(1),
(2) Date: Feb. 21, 2017

(87) PCT Pub. No.: WO2016/028308
PCT Pub. Date: Feb. 25, 2016

(65) Prior Publication Data
US 2019/0213743 A1 Jul. 11, 2019

(51) Int. Cl.
*G06T 7/33* (2017.01)
*G06T 7/00* (2017.01)
(Continued)

(52) U.S. Cl.
CPC ............ *G06T 7/337* (2017.01); *G06K 9/6215* (2013.01); *G06T 7/0012* (2013.01);
(Continued)

(58) Field of Classification Search
CPC ....... G06T 7/337; G06T 7/0016; G06T 19/20; G06T 7/70
See application file for complete search history.

(56) References Cited

U.S. PATENT DOCUMENTS 6,216,029 B1    4/2001  Paltieli
8,411,924 B2 *  4/2013  Makram-Ebeid ...... A61B 6/481
                                                 382/131
(Continued)

FOREIGN PATENT DOCUMENTS

WO      2012155136 A2      11/2012
WO   WO-2012155136 A2 *    11/2012  ........... G06T 3/0068
WO     20140127321 A2       8/2014

OTHER PUBLICATIONS

International Search Report for PCT/US2014/052260 published as WO2016/028308 dated Feb. 25, 2016.
(Continued)

*Primary Examiner* — Anand P Bhatnagar
(74) *Attorney, Agent, or Firm* — Anthony M. Del Zoppo, III; Daugherty & Del Zoppo, Co., LPA

(57) ABSTRACT

A method includes obtaining reference imaging data. The reference imaging data is acquired at a first time and includes tissue of interest. The method further includes obtaining update imaging data. The update imaging data is acquired at a second time. The second time is subsequent to the first time. The method further includes identifying a difference between the reference imaging data and the update imaging data. The method further includes changing the reference imaging data based on the identified difference. The method further includes displaying the changed reference imaging data.

20 Claims, 3 Drawing Sheets

(51) Int. Cl.
  *G06T 7/30* (2017.01)
  *G06K 9/62* (2006.01)
  *G06T 19/20* (2011.01)
  *G06T 7/70* (2017.01)
  *G06T 7/60* (2017.01)

(52) U.S. Cl.
  CPC .............. *G06T 7/0016* (2013.01); *G06T 7/30* (2017.01); *G06T 19/20* (2013.01); *G06T 7/60* (2013.01); *G06T 7/70* (2017.01); *G06T 2207/10072* (2013.01); *G06T 2207/10132* (2013.01); *G06T 2207/20092* (2013.01); *G06T 2207/20221* (2013.01); *G06T 2207/20224* (2013.01); *G06T 2219/2004* (2013.01)

(56) References Cited

U.S. PATENT DOCUMENTS

| | | | |
|---|---|---|---|
| 8,554,307 B2 | 10/2013 | Razzaque et al. | |
| 8,917,917 B2* | 12/2014 | Beymer | A61B 8/08 382/128 |
| 9,036,899 B2* | 5/2015 | Vandenberghe | A61B 6/14 382/154 |
| 9,218,643 B2* | 12/2015 | Siewerdsen | G06T 3/0068 |
| 9,678,644 B2* | 6/2017 | Buelow | G06T 19/20 |
| 9,785,246 B2* | 10/2017 | Isaacs | G06T 3/20 |
| 9,974,977 B2* | 5/2018 | Lachaine | G06T 7/11 |
| 2015/0287189 A1* | 10/2015 | Hirai | G06T 7/0012 382/131 |
| 2017/0325785 A1* | 11/2017 | Lieblich | A61B 8/483 |
| 2018/0047183 A1* | 2/2018 | Berlinger | G06T 7/74 |
| 2018/0322643 A1* | 11/2018 | Piper | A61B 8/4254 |

OTHER PUBLICATIONS

Nithiananthan, S. et al., Incorporating Tissue Excision in Deformable Image Registration: A Modified Demons Algorithm for Cone-Beam CT-Guided Surgery, SPIE Medical Imaging 2011, vol. 7964.

Reaungamornrat, S., et al., Tracker-on-C for Cone-Beam CT-Guided Surgery: Evaluation of Geometric Accuracy and Clinical Applications, SPIE Medical Imaging 2012, vol. 8316.

* cited by examiner

UPDATING REFERENCE IMAGING DATA WITH UPDATE 2D AND/OR 3D IMAGING DATA

RELATED APPLICATION

This application is a national filing of PCT application Serial No. PCT/US2014/052260, filed Aug. 22, 2014, published as WO2016/028308 on Feb. 25, 2016. This application claims priority to PCT application Serial No. PCT/US2014/052260, published as WO2016/028308 on Feb. 25, 2016.

TECHNICAL FIELD

The following generally relates to image processing and finds particular application with updating previously acquired (or reference) 2D and/or 3D imaging data with later or currently acquired (or update) 2D and/or 3D imaging data. Suitable imaging modalities include ultrasound, magnetic resonance imaging, computed tomography, and/or other imaging modalities.

BACKGROUND

An ultrasound imaging system includes a transducer array that transmits an ultrasound beam into an examination field of view. As the beam traverses structure (e.g., of a sub-region of an object or subject) in the field of view, sub-portions of the beam are attenuated, scattered, and/or reflected off the structure, with some of the reflections (echoes) traversing back towards the transducer array. The transducer array receives echoes, which are processed to generate an image of the sub-portion of the object or subject. The image is visually displayed.

Ultrasound has been used in a wide range of medical and non-medical applications. Examples of such procedures include surgery, biopsy, therapy, etc. With surgery, e.g., ultrasound has been used to assist a clinician with navigating to a tissue region of interest. For this, with one approach, reference 3D imaging data (e.g., MR, CT, etc.) is acquired prior to the procedure for planning purposes. At the beginning of the procedure (which could be months later), 2D and/or 3D imaging data (e.g., US, MR, CT, etc.) is acquired and fused to the reference 3D imaging data. The newly acquired 2D and/or 3D imaging data shows changes that have occurred between the acquisition of the reference 3D image data and the beginning of the procedure.

Such changes can be related to the size and/or location of the tissue of interest, a presence of new tissue of interest, an absence of previously identified tissue of interest, etc. However, fusing the 2D and/or 3D imaging data with the reference 3D imaging data is a time-intensive task. As a consequence, such fusion generally has been performed only at the beginning of the procedure. Thereafter, e.g., during the procedure, currently acquired 2D and/or 3D imaging data is overlaid over the reference 3D imaging data. Unfortunately, overlaying the currently acquired 2D and/or 3D imaging data over the reference 3D imaging data has resulted in visual clutter and uncertainty, e.g., due to misalignment of the information in the imaging data sets.

SUMMARY

Aspects of the application address the above matters, and others.

In one aspect, a method includes obtaining reference imaging data. The reference imaging data is acquired at a first time and includes tissue of interest. The method further includes obtaining update imaging data. The update imaging data is acquired at a second time. The second time is subsequent to the first time. The method further includes identifying a difference between the reference imaging data and the update imaging data. The method further includes changing the reference imaging data based on the identified difference. The method further includes displaying the changed reference imaging data.

In another aspect, a computing system is configured to modify previously acquired reference imaging data based on currently acquired update imaging data. The computing system includes a memory storing reference image data update module with computer executable instructions. The computing system further includes a processor that executes the computer executable instructions. The processor, in response to executing the computer executable instructions: registers the previously acquired reference imaging data and the currently acquired update imaging data, identifies at least one of structural information or functional information that is included in one of the previously acquired reference imaging data or the currently acquired update imaging data but not the other of the previously acquired reference imaging data or the currently acquired update imaging data, and modifies the previously acquired reference imaging data to one of include or exclude the at least one of the structural information or the functional information.

In another aspect, a computer readable storage medium is encoded with computer executable instructions, which, when executed by a processor, causes the processor to: register update imaging data with a sub-portion of reference imaging data; compare the registered update imaging data and the sub-portion of reference imaging data; determine the update imaging data either includes information not in the sub-portion or does not include information in the sub-portion; add the information to the sub-portion in response to the information being in the update imaging data and not in the sub-portion; subtract the information from the sub-portion in response to the information not being in the update imaging data and being in the sub-portion; and visually presenting the reference imaging data with the added or subtracted information.

Those skilled in the art will recognize still other aspects of the present application upon reading and understanding the attached description.

BRIEF DESCRIPTION OF THE DRAWINGS

The application is illustrated by way of example and not limited in the figures of the accompanying drawings, in which like references indicate similar elements and in which.

DETAILED DESCRIPTION

Figure 1:
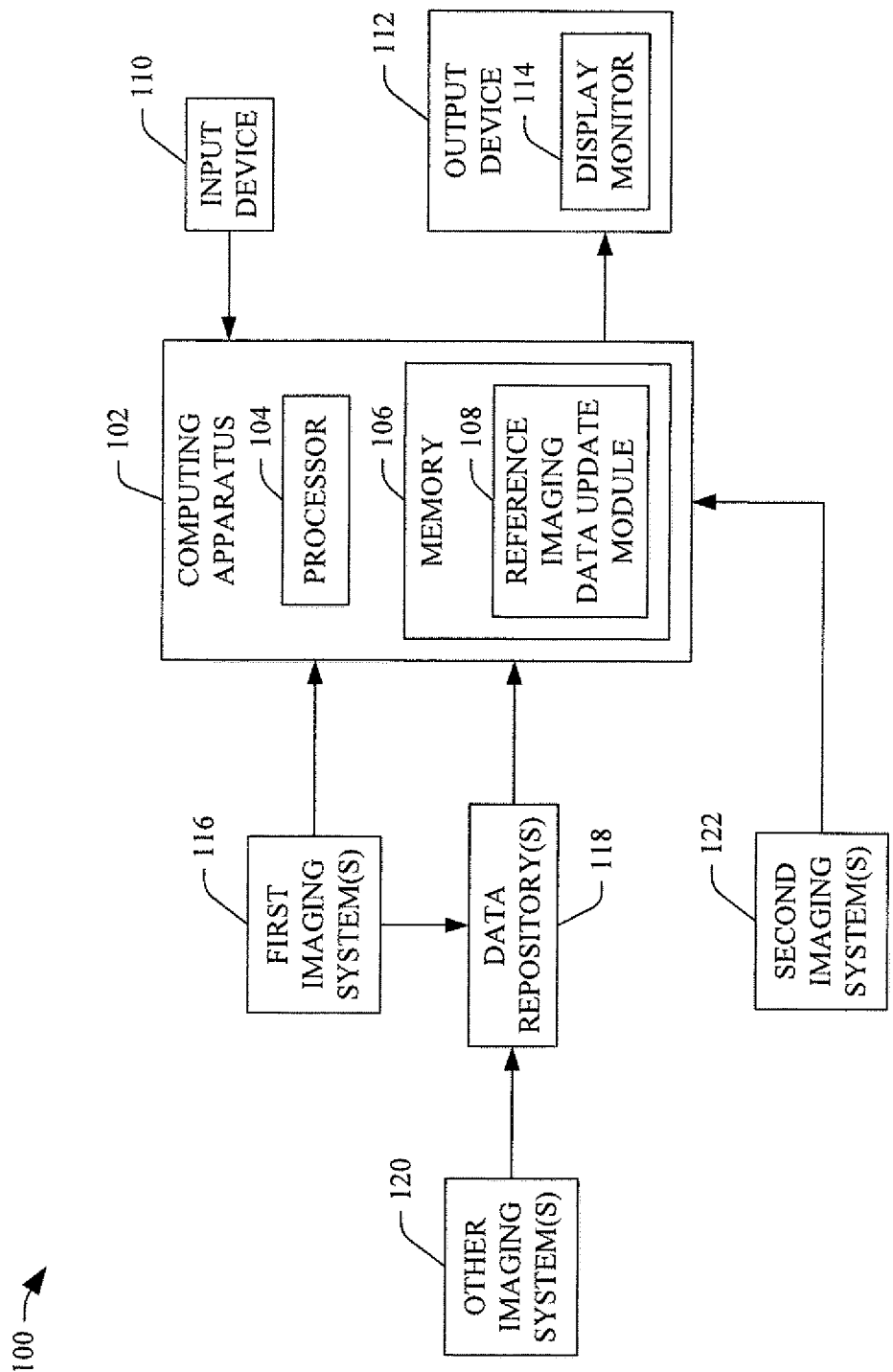
FIG. 1 schematically illustrates an example system which includes at least a computing apparatus with a reference imaging data update module in connection with an imaging system(s)

A system 100 includes a computing apparatus 102. The computing apparatus 102 includes at least one processor 104 such as a microprocessor, a central processing unit, etc. The computing apparatus 102 further includes computer readable storage medium ("memory") 106, which excludes transitory medium and includes physical memory and/or other non-transitory medium. In the illustrated example, the memory 106 includes a reference imaging data update module 108, which includes computer executable instructions.

The at least one processor 104 is configured to execute computer executable instructions, such as those of the module 108. The module 108, as described in greater detail below, updates previously acquired reference imaging data, which is acquired at a first time, based on update 2D and/or 3D imaging data, which is acquired subsequent to the reference imaging data at a second later time. In one non-limiting instance, the reference imaging data is acquired prior to a procedure (e.g., surgery, biopsy, ablation, therapy, etc.), and the update 2D and/or 3D imaging data is acquired after the reference imaging data and prior, at the commencement of, and/or during the procedure.

Generally, the update adds and/or subtracts structural and/or functional information to and/or from the reference imaging data based on the update 2D and/or 3D imaging data. That is, the update 2D and/or 3D imaging data drives changes to the reference 3D imaging data so that the visually presented updated reference imaging data visually reflects current structural and/or function changes between the most recent reference 3D imaging data and the most recent update 2D and/or 3D imaging data. Such an approach provides the clinician with a dynamic current snapshot in the reference imaging data, unlike a configuration in which newly obtained 2D and/or 3D imaging data is merely overlaid over static and aged reference imaging data.

The computing system 102 further includes an input device(s) 110 such as a mouse, keyboard, etc. The computing system 102 further includes an output device(s) 112 such as a display monitor 114, a filmer, portable storage, etc. In one instance, the reference imaging data, the update 2D and/or 3D imaging data, and/or the updated reference imaging data (also referred to as working imaging data herein) can be visually presented or displayed via the display monitor 114 and/or otherwise. By way of non-limiting example, in the context of a biopsy, the updated reference imaging data may show a current location of a needle, a current size, location, etc. of tissue of interest, and a projection from the needle to the tissue of interest.

In the illustrated embodiment, the computing system 102 obtains the reference imaging data from a first imaging system 116 (e.g., computed tomography (CT), magnetic resonance (MR), ultrasound (US), single photon emission computed tomography (SPECT), positron emission tomography (PET), etc.) and/or a data repository 118. The data repository 118 stores data from the first imaging system 116 and/or other imaging system 120. Examples of data repositories include a picture archiving and communication system (PACS), a radiology information system (RIS), a hospital information system (HIS), an electronic medical record (EMR), a server, and/or other data repository.

The update 2D and/or 3D imaging data is acquired by a second imaging system(s) 122 (e.g., CT, MRI, US, SPECT, PET, etc.). In one instance, the update 2D and/or 3D imaging data is used to update the reference imaging data as the update 2D and/or 3D imaging data is generated and becomes available. In another instance, the update 2D and/or 3D imaging data is used within a reasonable delay to ensure that the visually presented updated reference imaging data is useful for the procedure. In a variation, the first imaging system 116 and the second imaging system(s) 122 are the same imaging system.

Figure 2:
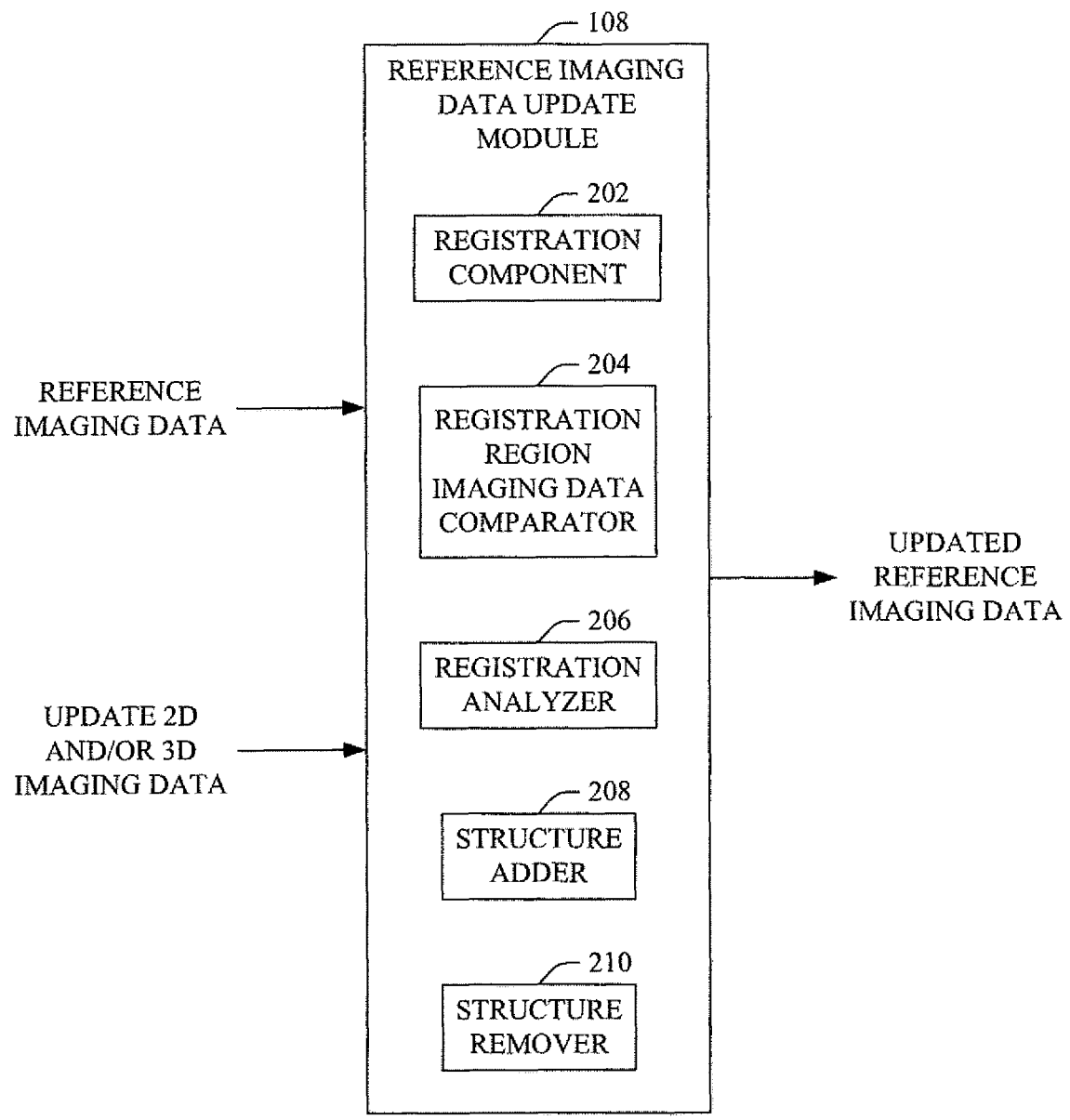
FIG. 2 schematically illustrates an example of the reference imaging data update module.

FIG. 2 illustrates an example of the reference imaging data update module 108.

The reference imaging data update module 108 receives, as input, reference imaging data and update 2D and/or 3D imaging data, as described in connection with FIG. 1 and/or otherwise. Where the update 2D and/or 3D imaging data includes a series of successively acquired 2D slices and/or thin volumes of 3D imaging data, the 2D slices (or subgroups of the slices) and/or the thin volumes of 3D imaging data (or subgroups of the thin volumes) are successively received. The 2D slices and/or thin volumes 3D volumes can be contiguous and/or separated by gaps.

In an example, the update 2D and/or 3D imaging data may include a series of 2D ultrasound slices acquired at ten (10) frames per second over two (2) minute interval, resulting in twelve hundred (1200) 2D slices. During the acquisition of the 2D ultrasound slices, the user moves the transducer array across the region of interest. Such movement can be at an approximately constant rate or at a non-constant rate such that at least two of the 2D slices cover different widths of within the region of interest. The 2D ultrasound slices are conveyed as they are generated or after a predetermined delay.

The reference imaging data update module 108 includes a registration component 202. The registration component 202 registers the update 2D and/or 3D imaging data with the reference imaging data. In one instance, this includes registering update 2D and/or 3D imaging data with the reference imaging data as the update 2D and/or 3D imaging data arrives. As such, sub-portions of the reference imaging data are successively registered with update 2D and/or 3D imaging data over time as the update 2D and/or 3D imaging data becomes available. The registration algorithm may include an affine (rigid) and/or elastic registration.

A non-limiting example of a suitable registration is described in international application serial number PCT/US13/72154, filed on Nov. 27, 2013, and entitled "Multi-Imaging Modality Navigation System," the entirety of which is incorporated herein by reference. PCT/US13/72154 describes an approach in which a location and a spatial orientation of a 2D ultrasound slice is located and/or mapped to a corresponding plane in a 3D volume. In PCT/US13/72154, this is achieved through a set of fiducial markers and/or otherwise. Other registration approaches are also contemplated herein.

A registration analyzer 206 analyzes the registration. This includes identifying structural and/or functional information that is present in the update 2D and/or 3D imaging data and absent from the reference imaging data and/or absent from the update 2D and/or 3D imaging data and present in the reference imaging data. This can be achieved by identifying a marker or voxel cloud in one of the registered data sets that does not match or have a corresponding marker or voxel cloud in the other data set, which indicates a data set has information not in the other data set. The registration analyzer 206 generates a signal that identifies such structural and/or functional information.

An information adder 208 adds structural and/or functional information present in the update 2D and/or 3D imaging data and absent from the reference imaging data to the reference imaging data. By way of non-limiting example, the added structural and/or functional information may correspond to growth of a tissue of interest (e.g., a tumor), a shift in position of the tissue of interest, new tissue of interest, etc. An information remover 210 removes structural and/or functional information absent from the update 2D and/or 3D imaging data and present in the reference imaging data from the reference imaging data. By way of non-limiting example, the subtracted structural and/or functional information may correspond to tissue of interest shrinkage, a shift in position of the tissue of interest, etc.

Where the update 2D and/or 3D imaging data arrives as successive 2D slices and/or thin 3D volumes, the information adder 208 adds or builds the missing structural and/or functional information to the reference imaging data over time, and the information remover 210 removes the extra structural and/or functional information from the reference imaging data over time. The resulting reference imaging data, after each structural and/or functional information addition and/or subtraction, represents a current state of the region of interest, reflecting any changes in the region of interest based on the 2D slice and/or thin 3D volume. The information can be added and/or subtracted through a wire frame mesh and/or other approach.

The structural and/or functional information can be added and/or removed in response to an input signal from the input device (FIG. 1) indicating an operator confirmed the addition and/or removal, e.g., through activating a physical and/or software generated button, outlining a region, etc. Alternatively, the module 108 can be configured to automatically add and/or remove structural and/or functional information. In another instance, the module 108 flags (e.g., outline, highlight, etc.) a region to apprise an operator of a difference for that region, and the operator accepts or rejects the addition or removal. The updates, changes, flagged sites, etc. can be saved, e.g., as metadata and/or other data, allowing the reference 3D imaging data to be utilized with the metadata to reconstruct a data set and further utilize the reference 3D imaging data.

Figure 3:
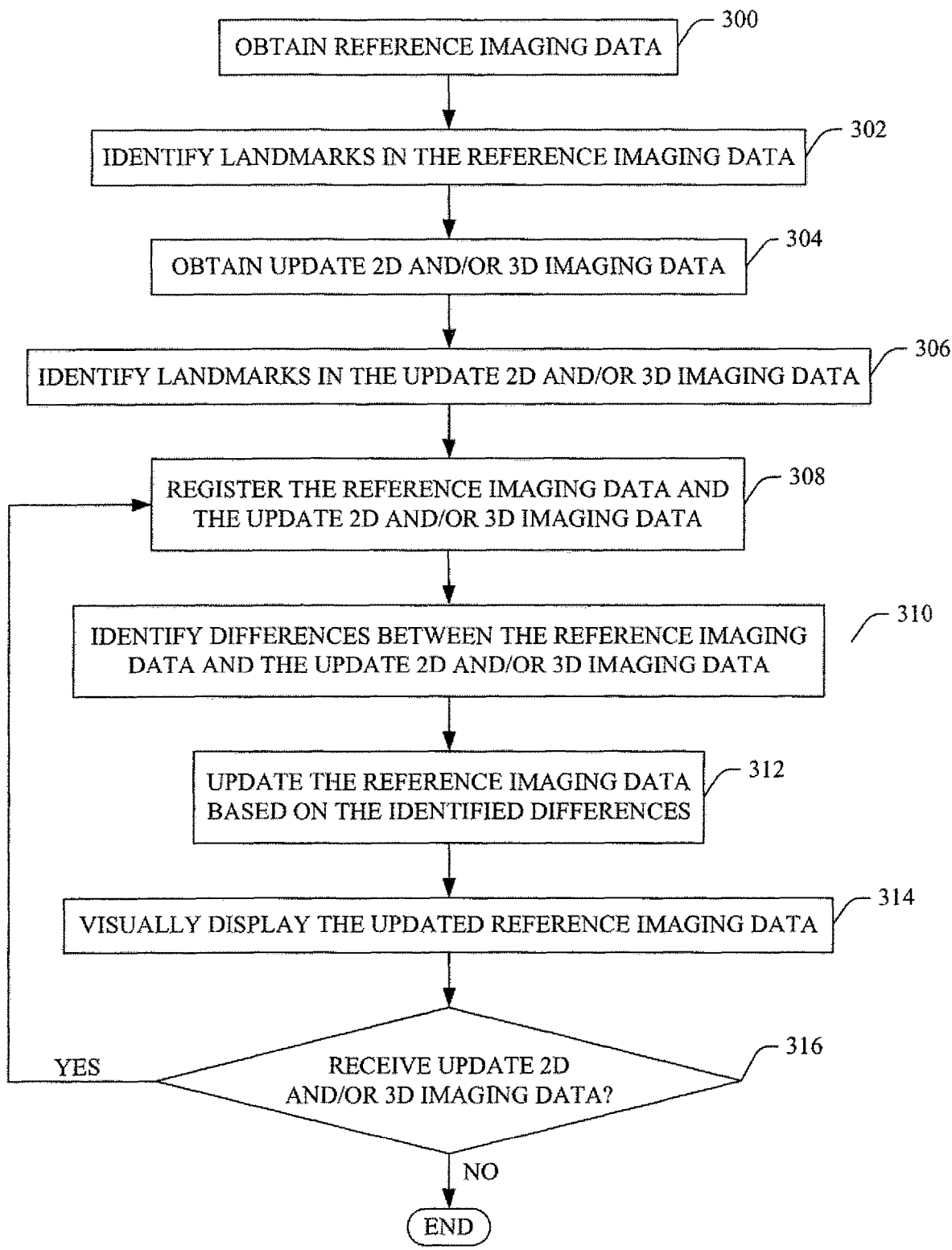
FIG. 3 illustrates an example method for dynamically updating reference imaging data with currently obtained update 2D and/or 3D imaging data.

FIG. 3 illustrates a method in accordance with the description herein.

At 300, reference imaging data is obtained for tissue of interest.

At 302, a plurality of landmarks is located in the reference imaging data.

In a variation, the plurality of landmarks can be identified before obtaining the reference imaging data, and the reference imaging data with the plurality of landmarks is obtained.

At 304, update 2D and/or 3D imaging data (which is acquired subsequent to acquiring the reference imaging data) of at least a sub-portion of the tissue of interest is obtained.

At 306, a plurality of corresponding landmarks is located in the update 2D and/or 3D imaging data.

At 308, the reference imaging data and/or the update 2D and/or 3D imaging data are registered, e.g., based on the landmarks At 310, structural and/or functional difference between the update 2D and/or 3D imaging data and the reference imaging data are identified.

At 312, the reference 3D imaging data is updated based on identified differences. This may include adding and/or removing structure and/or functional from the reference imaging data, as describe herein and/or otherwise. As such, the update 2D and/or 3D imaging data drives changes to the reference imaging data to visually reflect structural and/or function changes between the most recent reference imaging data and the most recent update 2D and/or 3D imaging data.

At 314, the updated reference imaging data is visually presented.

At 316, in response to receiving currently acquired update 2D and/or 3D, acts 308 to 314 are repeated.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A method, comprising:
    obtaining reference imaging data, wherein the reference imaging data is acquired at a first time and includes tissue of interest, wherein the reference imaging data includes one of computed tomography, magnetic resonance, single photon emission computed tomography, or positron emission tomography imaging data;
    obtaining update imaging data, wherein the update imaging data is acquired at a second time, wherein the second time is subsequent to the first time and includes ultrasound imaging data;
    identifying a difference between the reference imaging data and the update imaging data;
    changing the reference imaging data based on the identified difference; and
    displaying the changed reference imaging data.

2. The method of claim 1, wherein the reference imaging data includes one of 2D or 3D imaging data.

3. The method of claim 1, wherein the update imaging data includes one of 2D or 3D imaging data.

4. The method of claim 1, further comprising:
    driving the change to the reference imaging with the update imaging data.

5. The method of claim 1, wherein the change includes adding at least one of structural information or functional information to the reference imaging data.

6. The method of claim 5, wherein the at least one of structural information or functional information is present in the update imaging data and absent from the reference imaging data.

7. The method of claim 1, wherein the change includes removing at least one of structural information or functional information from the reference imaging data.

8. The method of claim 7, wherein the at least one of structural information or functional information is absent from the update imaging data and present in the reference imaging data.

9. The method of claim 1, wherein the reference imaging data includes 3D imaging data covering a first volume and the update imaging data include a plurality of successively acquired 2D slices or 3D imaging data covering a second volume, wherein the second volume is a subset of the first volume, and, further comprising:
    successively changing the reference imaging data over time as the update imaging data becomes available.

10. The method of claim 1, further comprising:
    changing the reference imaging data at least one of commencement of a procedure or during the procedure.

11. The method of claim 1, further comprising:
dynamically changing the reference imaging data with currently acquired update imaging as the currently acquired update imaging becomes available.

12. The method of claim 1, wherein the difference is indicative of a change in a size of the tissue of interest.

13. The method of claim 1, wherein the difference is indicative of a change in a location of the tissue of interest.

14. The method of claim 1, wherein the difference is indicative of a new tissue of interest.

15. A computing system configured to modify previously acquired reference imaging data based on currently acquired update ultrasound imaging data, comprising:
a memory including a reference image data update module with computer executable instructions; and
a processor that executes the computer executable instructions, which causes the processor to: register the previously acquired reference imaging data and the currently acquired update ultrasound imaging data, identify at least one of structural information or functional information that is included in one of the previously acquired reference imaging data or the currently acquired update ultrasound imaging data but not the other of the previously acquired reference imaging data or the currently acquired update ultrasound imaging data, modify the previously acquired reference imaging data to one of include or exclude the at least one of the structural information or the functional information, and builds or removes the at least one of the structural information or the functional information over time as current update imaging data becomes available.

16. The computing system of claim 15, wherein the processor modifies the previously acquired reference imaging data using a wire frame mesh.

17. The computing system of claim 15, wherein the update ultrasound imaging data arrives as successive 2D slices or thin 3D volumes and building or removing the at least one of the structural information or the functional information over time includes successively registering sub-portions of the previously acquired reference imaging data with the update ultrasound imaging data as the update ultrasound imaging data becomes available.

18. The computing system of claim 15, wherein the processor automatically, without user interaction, modifies the previously acquired reference imaging data.

19. The computing system of claim 15, wherein the processor modifies the previously acquired reference imaging data in response to a signal indicative of a user input accepting the modification.

20. A computer readable storage medium encoded with computer executable instructions, which, when executed by a processor, causes the processor to:
register update ultrasound imaging data with a sub-portion of reference imaging data;
compare the registered update ultrasound imaging data and the sub-portion of reference imaging data;
determine the update ultrasound imaging data either includes information not in the sub-portion or does not include information in the sub-portion;
add the information to the sub-portion in response to the information being in the update ultrasound imaging data and not in the sub-portion;
subtract the information from the sub-portion in response to the information not being in the update ultrasound imaging data and being in the sub-portion; and
visually presenting the reference imaging data with the added or subtracted information.

* * * * *